United States Patent [19]
Jeon et al.

[11] Patent Number: 6,157,629
[45] Date of Patent: Dec. 5, 2000

[54] CDMA MOBILE COMMUNICATION SYSTEM OF AUTOMATICALLY CHANGING FREQUENCY AND METHOD THEREOF

[75] Inventors: Han-Koo Jeon, Seoul; Seung-Hyon Min; Weon-Moo Kim, both of Kyoungki-do, all of Rep. of Korea

[73] Assignee: Hyundai Electronisc Ind. Co., Ltd., Kyoungki-do, Rep. of Korea

[21] Appl. No.: 09/034,822

[22] Filed: Mar. 4, 1998

[30] Foreign Application Priority Data

Apr. 18, 1997 [KR] Rep. of Korea ............ 97-14486

[51] Int. Cl.[7] ................ H04B 1/38; H04J 1/00
[52] U.S. Cl. .............. 370/335; 370/480; 370/329; 445/67.1; 445/561
[58] Field of Search ................ 370/242, 342, 370/479, 480, 496, 329, 335; 455/8, 423–424, 67.1, 561, 503; 714/712

[56] References Cited

U.S. PATENT DOCUMENTS

| 4,870,408 | 9/1989 | Zdunek et al. |
| 5,528,599 | 6/1996 | Rodriguez et al. ........... 714/712 |
| 5,596,571 | 1/1997 | Gould et al. |
| 5,619,492 | 4/1997 | Press et al. |
| 5,666,653 | 9/1997 | Ahl ........................... 455/443 |
| 5,740,166 | 4/1998 | Ekemark et al. ............... 370/331 |
| 5,854,786 | 12/1998 | Henderson et al. ............ 370/335 |
| 5,930,248 | 7/1999 | Langlet ....................... 455/503 |
| 5,978,413 | 11/1999 | Bender ........................ 370/342 |

*Primary Examiner*—Ricky Ngo
*Assistant Examiner*—Maikhanh Tran
*Attorney, Agent, or Firm*—Reed Smith Shaw & McClay LLP

[57] ABSTRACT

In a method of automatically changing a frequency in a CDMA mobile communication system where multiple frequencies are assigned to a base transceiver station, states of an RFC, ACC, and SIC are periodically checked thus parts of them where errors are detected are cut off, a frequency processed by the part having the error is detected and excluded from overhead data, and, when the frequency which is processed by the part having the error is a fundamental frequency, other part is made to take charge of the fundamental frequency. Reversely, parts which are restored from an error state to a normal state are turned "ON", and the restored part is made to process the fundamental frequency as was before and a part which currently processes the fundamental frequency is made to process its original frequency when the restored part is one for the fundamental frequency.

7 Claims, 8 Drawing Sheets

(A)

(B)

CDMA MOBILE COMMUNICATION SYSTEM OF AUTOMATICALLY CHANGING FREQUENCY AND METHOD THEREOF

BACKGROUND OF THE INVENTION

1. Field of the Invention

The present invention relates to a code division multiple access (CDMA) mobile communication system. More particularly, this invention relates to a CDMA mobile communication system of automatically changing a frequency and method thereof for continuously maintaining a call service for a terminal which belongs to a cell covered by a base transceiver station even when devices constituting the base transceiver station have errors thereby to abnormally operate or when the device having an error is restored to a normal state while the base transceiver station is performing multi-frequency assignment operation.

2. Discussion of Related Art

FIG. 1 is a block diagram showing configuration of a CDMA mobile communication system in hardware.

This CDMA mobile communication system comprises a mobile station 1 which is a terminal of a subscriber, such as a car phone and cellular phone, a base transceiver station 2 constructed in each cell for connecting the mobile station 1 to a base station controller 3 thus allowing transmission and reception of various signal information through a data link, and the base station controller 3 for processing incoming/outgoing traffic channels and calls of a switching center 4.

In the general CDMA mobile communication system, a frequency of about 800 MHz having a bandwidth of 10 MHz is assigned to a base transceiver station, and this frequency is divided into about 8 frequencies having a bandwidth of 1.25 MHz for a control. In the multi-frequency assignment operation of the mobile communication system, in case that a device has an error in an abnormal state and is not capable of performing its function, terminals which use the frequency charged by the device having the error cannot be given a call service. When a cell is defined as an area controlled by a base transceiver station and this cell is divided into three sectors, such as an alpha, beta, and gamma as shown in FIG. 2, using a directional antenna, each sector uses multiple frequencies (for example, eight frequencies) in common, with interference of one another being minimized using the directional antenna.

There are many devices in a base transceiver station. A radio frequency card (RFC) converts an intermediate frequency (IF) signal of 4.590 MHz into a signal of an ultrahigh frequency (UHF) band. One RFC is installed for one sector and includes multiple parts performing the above function for each frequency. An analog common card (ACC) receives three timing signals and supplies them to the remaining parts of a digital shelf. One ACC is installed for one sector and has multiple parts performing the above function for each frequency. A sector interface card (SIC) combines baseband forward signals, up-converts a combined result into the IF frequency, and supplies timing. One SIC performs the above function for each frequency of each sector.

In the multi-frequency assignment operation of a base transceiver station, in case that an error occurs in a part for a specific frequency in the RFC of a specific sector thus the part is in an abnormal state, terminals using the relevant frequency and sector cannot be given a call service. Similarly, in case that the ACC has an error and malfunction, terminals using the relevant frequency and sector cannot be given a call service. When a part of the SIC for a specific frequency has an error, terminals using the relevant frequency cannot be given a call service regardless of the sector.

When making a primary call, a terminal receives overhead information from a base transceiver station using a fundamental frequency, has its own mobile identification number (MIN), and determines which frequency it will use according to a hash function. When an error occurs in a part of the RFC or ACC corresponding to the fundamental frequency resulting in a malfunction, the overhead information cannot be received from the base transceiver station, whereby the terminal cannot use other normal frequencies as well as the fundamental frequency. When an error occurs in a part of the SIC for the fundamental frequency, the terminals within the relevant cell cannot be given the call service although other parts for other frequencies are in normal state.

In other words, there is a drawback in the conventional CDMA system that all terminals in a cell covered by a base transceiver station cannot take a call service when an error occurs in a part charging a fundamental frequency in a device constituting the base transceiver station.

SUMMARY OF THE INVENTION

Accordingly, the present invention is directed to a CDMA mobile communication system of automatically changing a frequency and method thereof that substantially obviates one or more of the limitations and disadvantages of the related art.

An object of the present invention is to provide a CDMA mobile communication system of automatically changing a frequency and method thereof wherein, although an error occurs in a part for a fundamental frequency in a multi-frequency assignment operation of a base transceiver station, a part not having an error can take a call service by causing other part charging other frequency to take charge of the fundamental frequency.

Another object of the present invention is to provide a CDMA mobile communication system of automatically changing a frequency and method thereof for maintaining a call service for a terminal using a frequency charged by a device when the device which has an error or abnormally operates is restored to a normal state.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, there is provided with a method of automatically changing a frequency in a CDMA mobile communication system where multiple frequencies are assigned to a base transceiver station, wherein states of an RFC, ACC, and SIC are periodically checked thus parts of them where errors are detected are cut off, a frequency processed by the part having the error is detected and excluded from overhead data, and, when the frequency which is processed by the part having the error is a fundamental frequency, other part is made to take charge of the fundamental frequency, and reversely, parts which are restored from an error state to a normal state are turned "ON", and the restored part is made to process the fundamental frequency as was before and a part which currently processes the fundamental frequency is made to process its
} original frequency when the restored part is one for the fundamental frequency.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 5A:
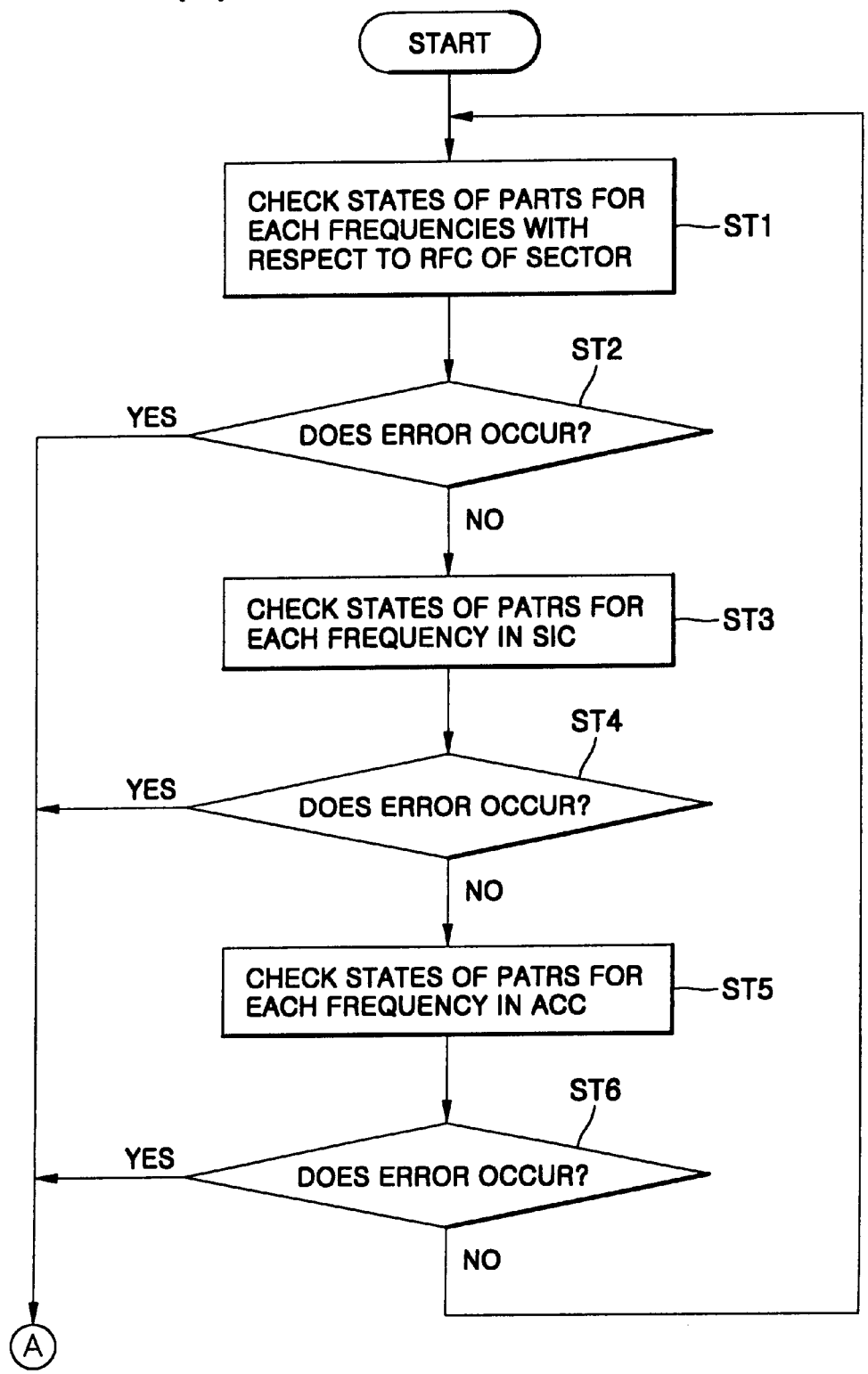
Figure 5B:
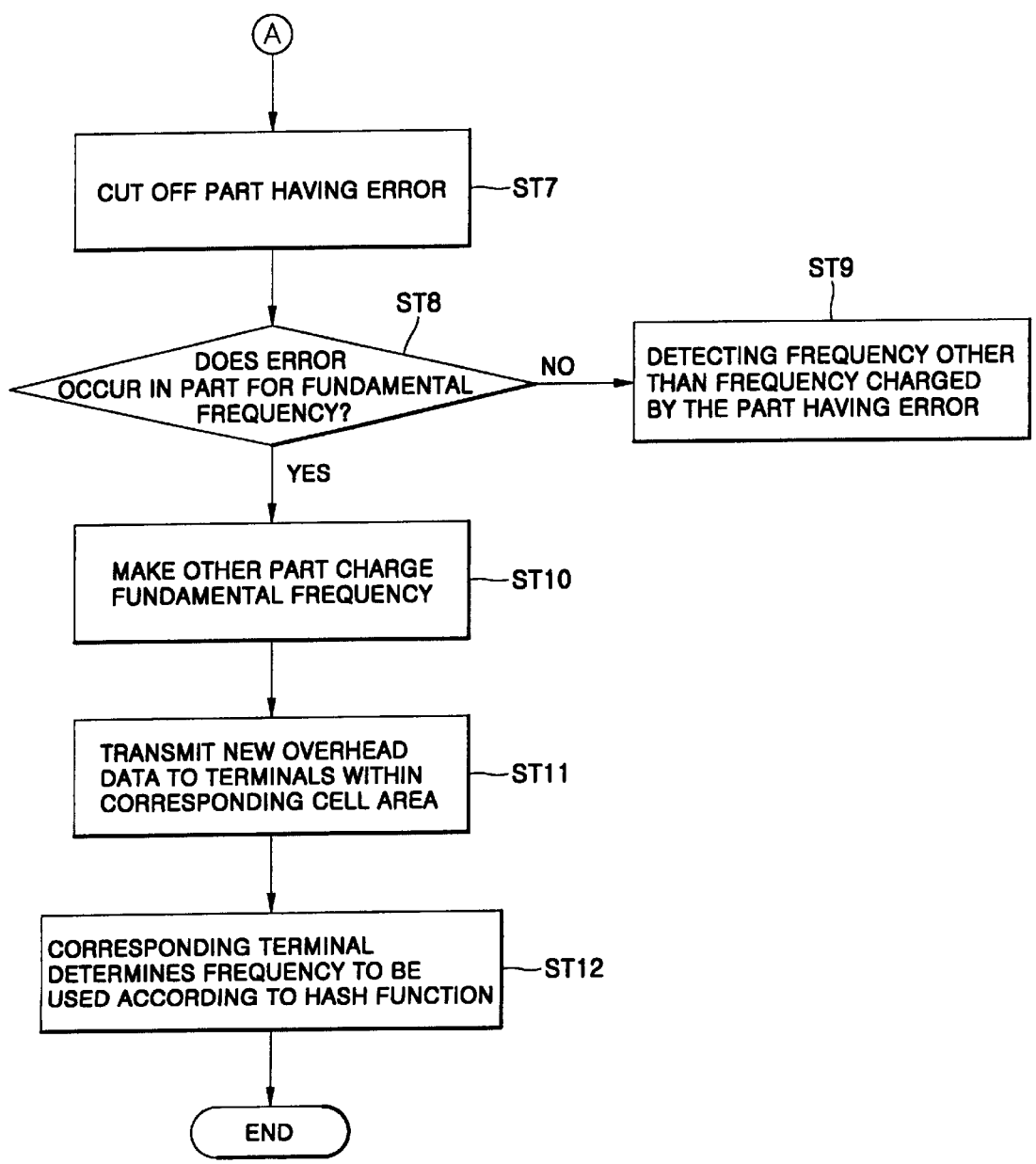
Figure 6:
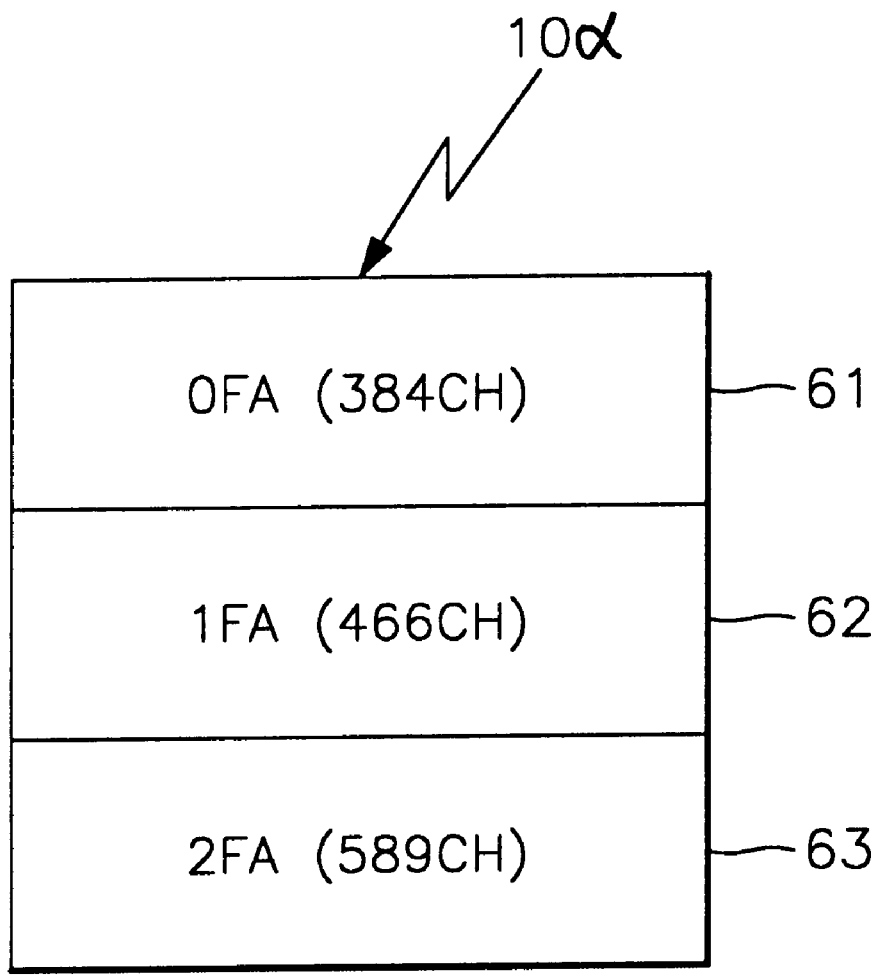
Figure 7A:
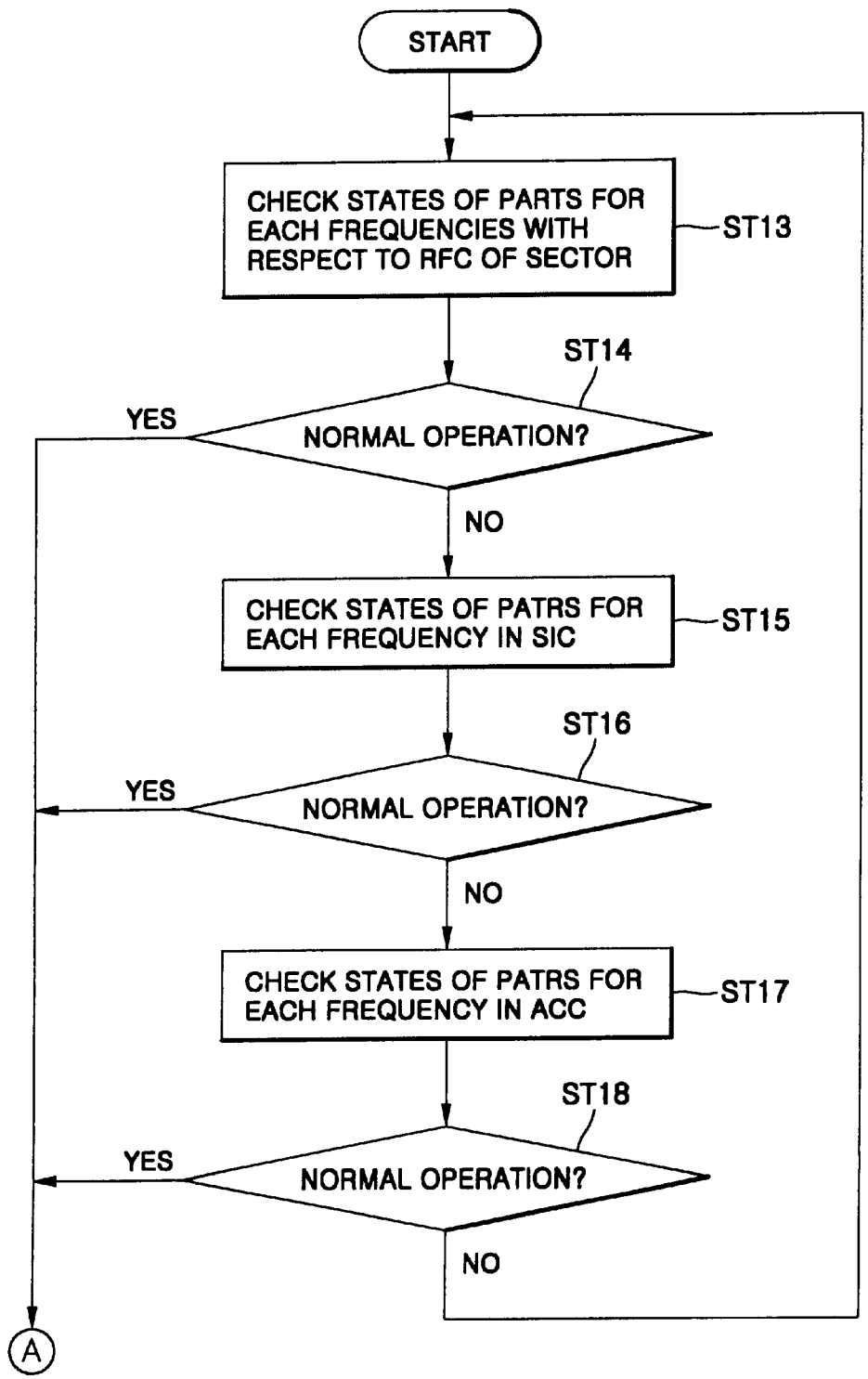
Figure 7B:
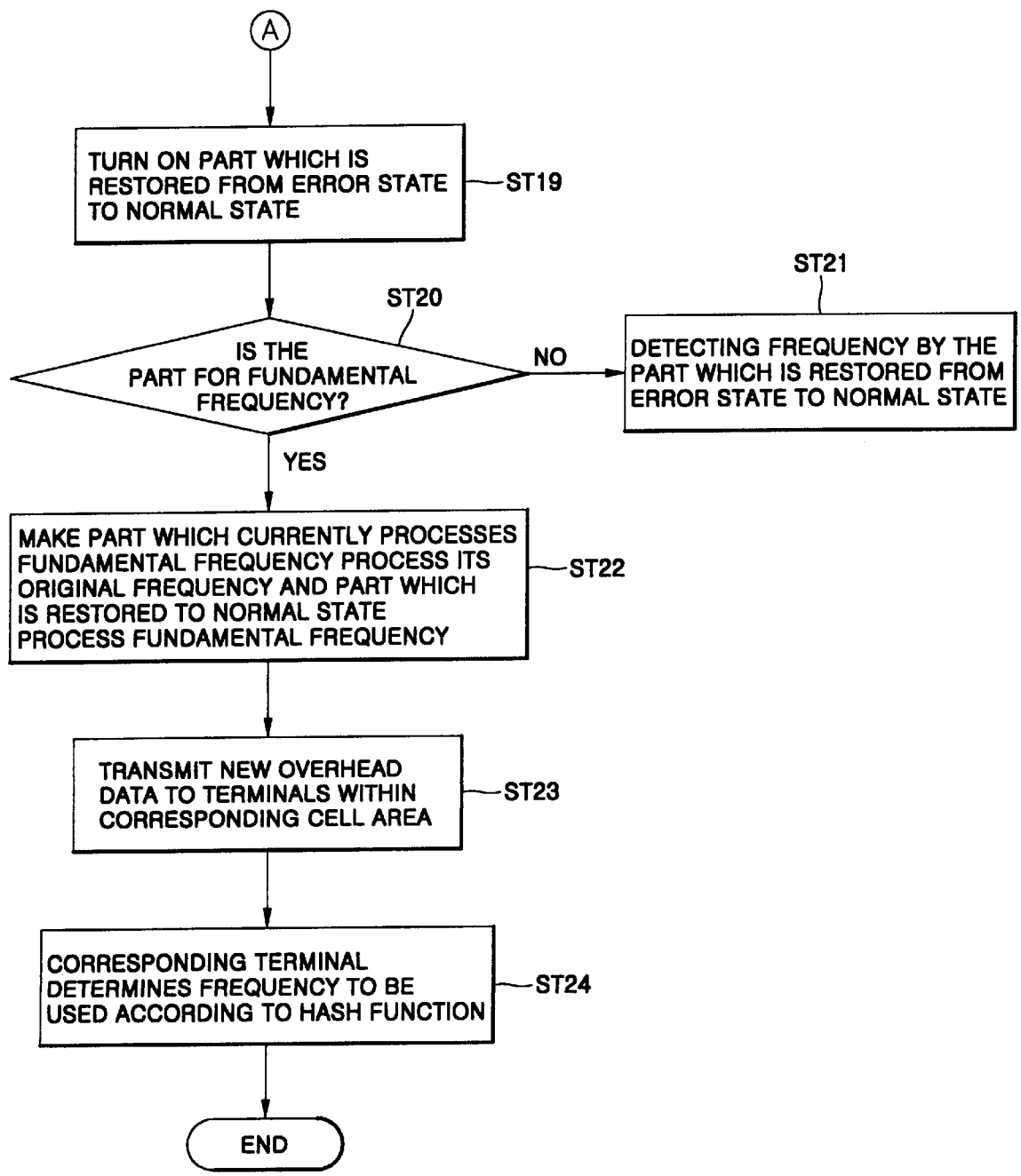

FIGS. 5(A) and 5(B) are flow charts showing an automatic channel changing method of a CDMA mobile communication system in accordance with the present invention when errors occur in devices constituting a base transceiver station;

FIG. 6 shows a case that an error occurs in a part charging a fundamental frequency in an RFC of an alpha sector; and FIGS. 7(A) and 7(B) are flow charts showing a method of automatically changing a frequency of a part having an error in a device constituting a base transceiver station when the part of the device is restored to a normal state.

DETAILED DESCRIPTION OF PREFERRED EMBODIMENT

Reference will now be made in detail to the preferred embodiments of the present invention, examples of which are illustrated in the accompanying drawings.

The present invention is described below in detail with reference to the accompanying drawings.

Figure 1:
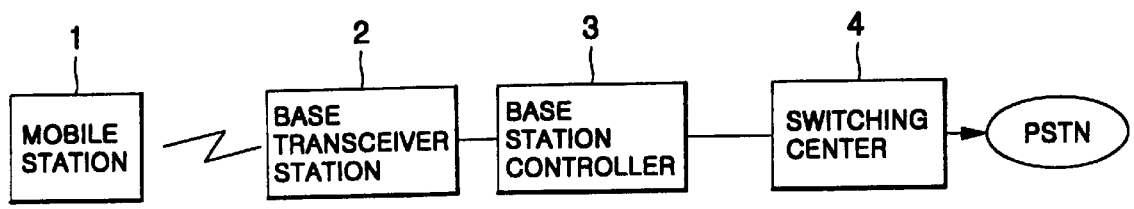
FIG. 1 is a block diagram of a CDMA mobile communication system.
Figure 2:
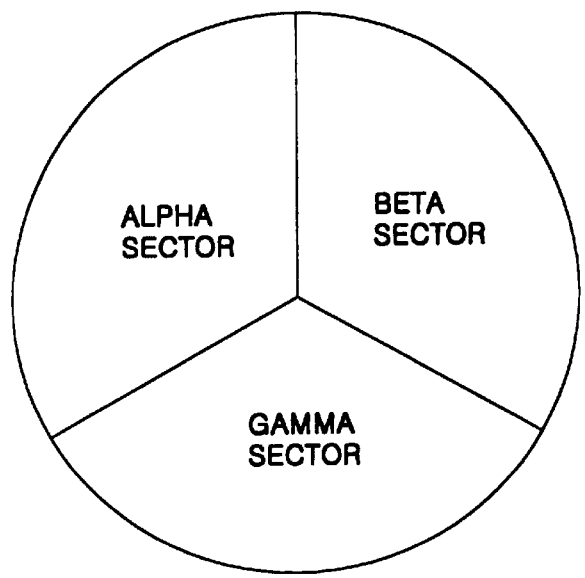
FIG. 2 shows three sectors (alpha, beta, gamma) of a cell controlled by a base transceiver station.
Figure 3:
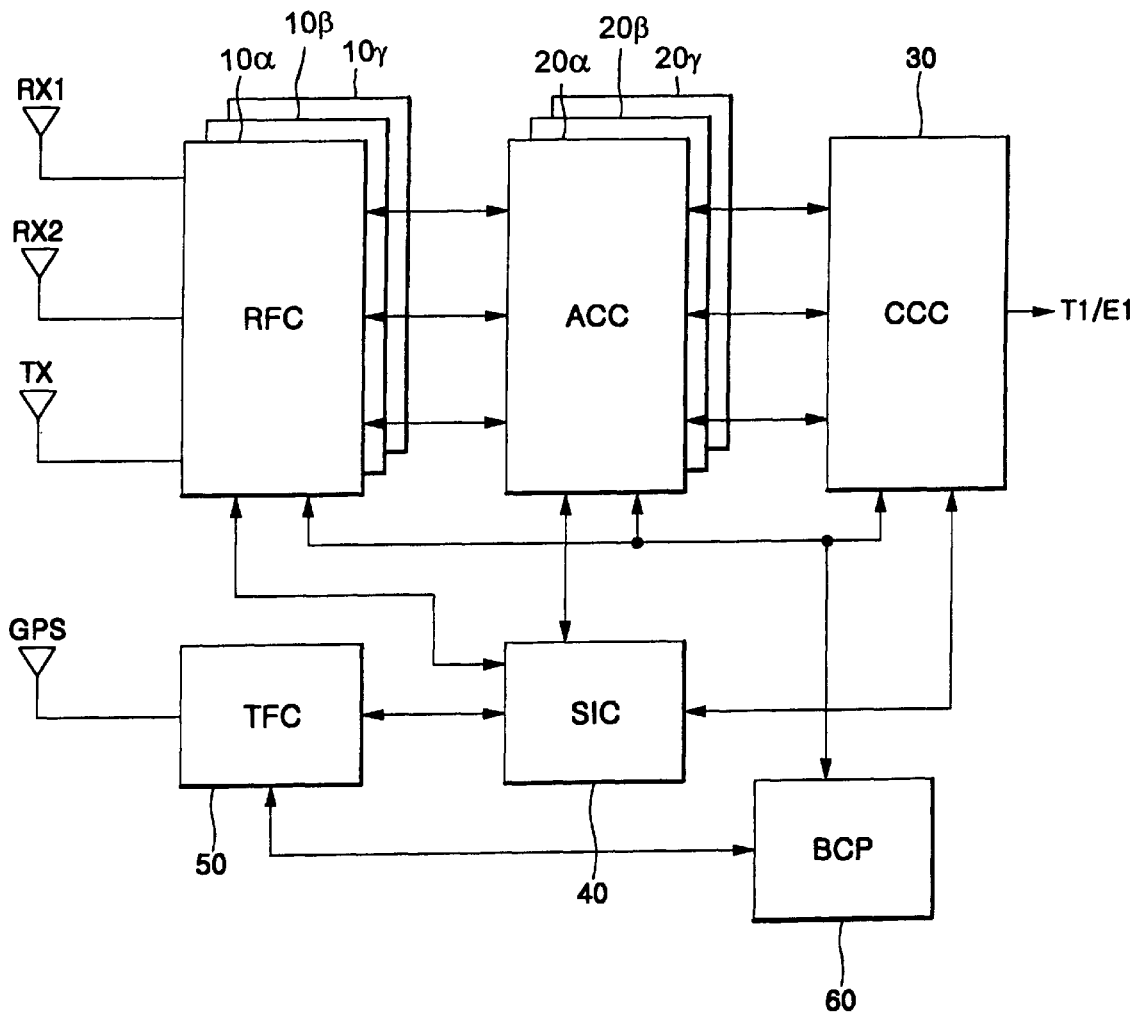
FIG. 3 is block diagram of a base transceiver station of a mobile communication system in accordance with the present invention.

As shown in FIG. 3, RFCs (10α, 10β, 10γ) not only convert an IF signal of 4.590 MHz into a signal of a UHF band but also perform administration, coordination, and monitoring of each module in an RF rack. The RFCs are respectively installed in sectors. The RFC is divided into multiple parts for each frequency, and each part performs the above functions.

ACCs (20α, 20β, 20γ) receive three timing signals and supply them to the remaining parts of a digital shelf. They also perform routing between processors for communication with a base control processor (BCP) 60 and supply system clocks to a channel common card (CCC) 30. The ACC is divided into multiple parts for each frequency, and each part performs the above functions.

A time and frequency card (TFC) 50 provides a clock and time of delay (TOD) for other devices. A sector interface card (SIC) 40 combines baseband forward signals, up-converts a combined result into the IF frequency, and supplies timing. One SIC performs the above functions to each frequency of all the sectors. The BCP 60 periodically checks the states of RFCs (10α, 10β, 10γ), ACCs (20α, 20β, 20γ), and SIC 40 thus cuts off parts where errors are detected and excludes from overhead data a frequency taken charge of by the part having an error. When the frequency is a fundamental frequency, the BCP 60 makes other part take charge of the fundamental frequency. Reversely, the BCP turns "ON" parts which are restored from an error state to a normal. When the restored part is for the fundamental frequency, the BCP 60 makes the restored part process the fundamental frequency and a part which currently processes the fundamental frequency process its original frequency. The BCP 60 also controls and monitors each unit constituting the base transceiver station.

When the base transceiver station is operated in a multi-frequency assignment where multiple frequencies are assigned to each sector, if one or more of the RFCs (10α, 10β, 10γ), ACCs (20α, 20β, 20γ), and SIC 40 has errors and operates abnormally, a terminal in a cell which uses a frequency charged by the part having the error cannot be given a call service.

Figure 4:
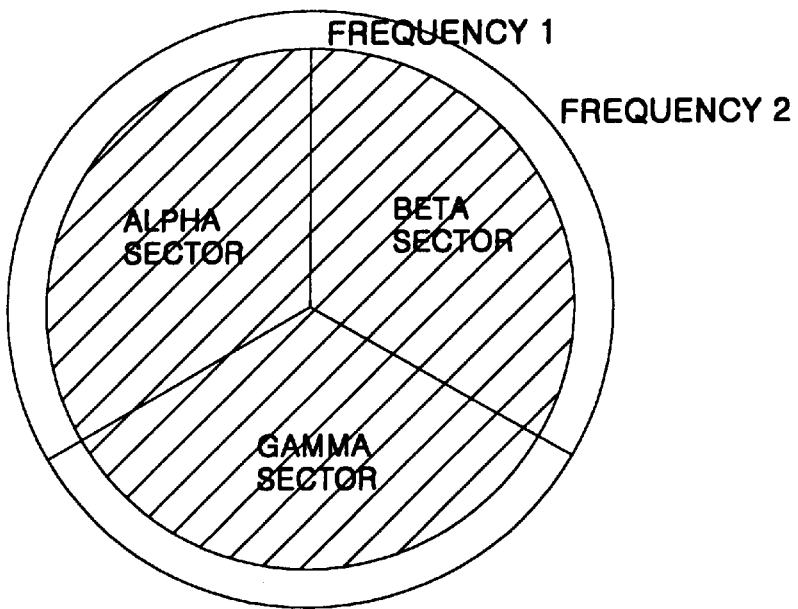
FIG. 4(A) shows an abnormal state resulting from occurrence of an error in a part of an SIC charging a specific frequency.
FIG. 4(B) shows an abnormal state resulting from occurrence of an error in an RFC's part of a beta sector charging a fundamental frequency.
Figure 4:
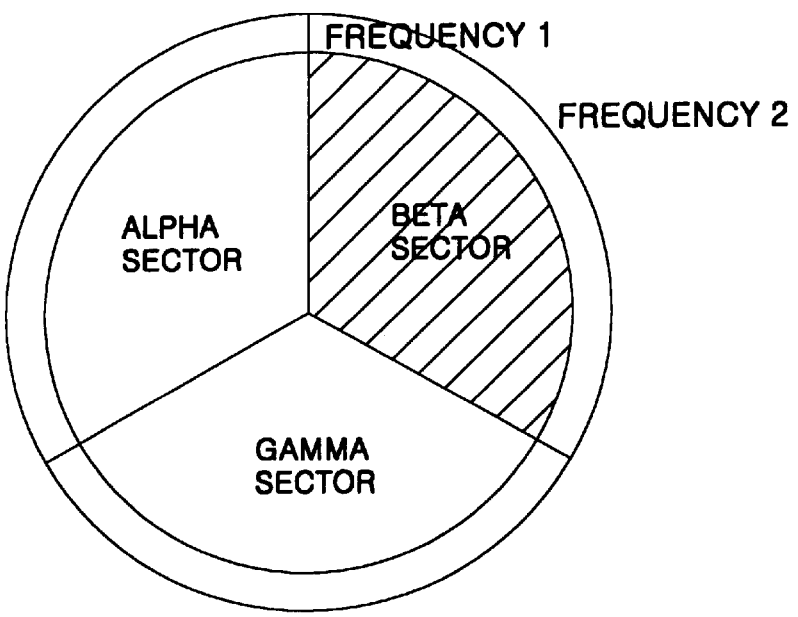

More specifically, as shown in FIG. 4(A), in case that a part charging a specific frequency in the SIC 40 has an error and operates abnormally, a terminal using a frequency charged by the part having the error amongst terminals in the cell area cannot be given a call service regardless of its sector. In FIG. 4(B), in case that a part charging a specific frequency in the RFC 10β of the beta sector has an error and operates abnormally, a terminal in the beta sector of the cell cannot be given the call service.

When making a primary call, a terminal receives overhead information from a base transceiver station using a fundamental frequency, has its own mobile identification number (MIN), and determines which frequency it will use according to a hash function. More particularly, in the multi-FA operation, the base transceiver station transmits the number of frequencies which it operates on and frequency numbers to all terminals in the corresponding cell, using the fundamental frequency. Once the terminal receives the frequency, it determines which frequency it will use according to a hash function for an efficient usage of frequency. For example, if an error occurs in an RFC of an alpha sector charging the frequency of 466, interrupting a normal operation, in a base transceiver station using frequencies of 384, 466, and 589, terminals using the frequency of 466 within the alpha sector cannot be given the call service. In this situation, the base transceiver station automatically detects the RFC where the error occurs and retransmits a frequency available to the terminals using the frequency of 466 within the alpha sector thereby making the terminals use the 384 or 589 frequency other than the 466 frequency in the present invention.

In case that an error occurs in a part for a fundamental frequency in devices constituting a base transceiver station, the base transceiver station must automatically assign one of its frequencies other than the fundamental frequency to a terminal to allow the terminal to be given a call service.

FIGS. 5(A) and 5(B) are flow charts showing an automatic channel changing method of a CDMA mobile communication system in accordance with the present invention when errors occur in devices constituting a base transceiver station.

Devices (e.g., ACC 20, RFC 10, SIC 40) of a base transceiver station are checked for error detection through steps ST1 to ST6. The steps ST1 to ST6 are sequentially performed. More specifically, states of parts for each frequency are checked with respect to the RFCs (10α, 10β, 10γ) of each sector (step ST1). Whether or not errors occur in the parts for each frequency with respect to the RFCs (10α, 10β, 10γ) in each sector is determined (step ST2). If the error occurs, the procedure goes to step ST7. If the error does not occur, states of parts for each frequency in the SIC 40 is checked (step ST3). Whether or not errors occur in the parts for each frequency in the SIC 40 is determined (step ST4). If the error occurs, step ST7 is performed. If the error does not occur, states of parts for each frequency are checked with respect to the ACCs (20α, 20β, 20γ) in each sector (step ST5). Whether or not errors occur in the parts for each frequency with respect to the ACCs (20α, 20β, 20γ) in each sector is determined (step ST6). If the error occurs, step ST7 is performed. If the error does not occur, the procedure turns back to the step ST1 and repeats the above steps.

The part where an error is detected is cut off (step ST7). Whether or not an error occurs in a part for a fundamental frequency is determined (step ST8). When an error is not detected from the part for the fundamental frequency, remaining frequencies other than a frequency of the part having the error are detected (step ST9), and the procedure goes to step ST11. When the error is detected from the part for the fundamental frequency, other part is made to charge the fundamental frequency (step ST10). For example, as shown in FIG. 6, in case that an error occurs in a part 61 for a fundamental frequency (0FA: 384 channel) in the RFC 10α of the alpha sector, the part 61 is cut off and a part 62 where an error does not occur is made to charge the fundamental frequency (0FA: 384 channel).

New overhead data is transmitted to the terminals within the corresponding cell area (step ST11). The terminal receives the new overhead data and selects a frequency to be used based on a hash function (step ST12).

In case that, in devices constituting a base transceiver station (e.g., ACC 20, RFC 10, and SIC 40), parts which were in an error state due to change of external environment are restored to a normal state through repair or substitution, overhead data must be automatically changed to allow terminals to use the frequencies of the parts which are restored to the normal state.

FIGS. 7(A) and 7(B) are flow charts showing a method of automatically changing a frequency of a part having an error in a device constituting a base transceiver station when the part of the device is restored to a normal state.

Through steps ST13 to ST18, devices of the base transceiver station (e.g., ACC 20, RFC 10, and SIC 40) are periodically checked to determine whether the devices are restored from an error state to a normal state. The steps ST13 to ST18 are supposed to be sequentially performed. More specifically, states of parts for each frequency are checked with respect to the RFCs (10α, 10β, 10γ) of each sector (step ST13). Whether or not the parts of the RFCs (10α, 10β, 10γ) of each sector which had the error operate currently in the normal state is determined (step ST14). In case that the parts operate in the normal state, the procedure goes to step ST19. In case that the part does not operate in the normal state, parts for each frequency in the SIC 40 are checked (step ST15). Whether or not the part having an error in the SIC 40 operates in the normal state is determined (step ST16). When the part having the error operates in the normal state, step ST19 is performed next. When the part having the error does not operate in the normal state, parts for each frequency are checked with respect to the ACCs (20α, 20β, 20γ) of each sector (step ST17). Whether or not the parts for each frequency in the ACCs (20α, 20β, 20γ) of each sector operate in the normal state is determined (step ST18). When the parts of the ACCs operate in the normal state, the procedure goes to step ST19. When the part of the ACCs does not operate in the normal state, the procedure turns back to step ST13 to repeat the above steps.

The parts which are restored to the normal state are turned "ON" (step ST19). Whether the parts which are restored from the error state to the normal state take charge of the fundamental frequency is determined (step ST20). When the part does not charge the fundamental frequency, a frequency charged by the part is detected (step ST21) and the procedure goes to step ST23. When the part charges the fundamental frequency, a part currently processing the fundamental frequency is restored so as to charge its original frequency and the part for the fundamental frequency which is restored from the error state to the normal state is made to charge the fundamental frequency as was before (step ST22). New overhead data is transmitted to the terminals in the corresponding cell area (step ST23). The terminal receives the new overhead data and selects a frequency to be used based on a hash function (step ST24).

As illustrated, the present invention allows a terminal to be continuously given a call service even when an error occurs in a specific part of a device of a base transceiver station in such a manner that, although a part for a fundamental frequency in the device has an error, other part is made to charge the fundamental frequency thus the other parts not having an error can give the call service, and when a part having an error is restored to a normal state and the restored part originally processes the fundamental frequency, the part is restored to process the fundamental frequency.

It will be apparent to those skilled in the art that various modifications and variations can be made in a CDMA mobile communication system of automatically changing a frequency and its method of the present invention without deviating from the spirit or scope of the invention. Thus, it is intended that the present invention cover the modifications and variations of this invention provided they come within the scope of the appended claims and their equivalents.

What is claimed is:

1. A code division multiple access (CDMA) mobile communication system of automatically changing a frequency, wherein a base transceiver station of the CDMA mobile communication system comprises: a radio frequency card (RFC) for converting an intermediate frequency (IF) signal into a signal of ultrahigh frequency (UHF); band and performing administration, coordination, and monitoring with respect to each module in a radio frequency rack; an analog common card (ACC) for receiving and supplying timing signals to remaining parts of a digital shelf, performing routing between processors for communication with a base control processor (BCP), and supplying system clocks to a channel common card (CCC); a sector interface card (SIC) for combining baseband forward signals, up-converting a combined result into the IF frequency, and supplying timing; and the base control processor (BCP) for periodically checking the states of the RFC, ACC, and SIC thus cutting off parts where errors are detected, detecting a frequency processed by the part having the error and excluding it from overhead data, and, when the frequency is a fundamental frequency, making other part take charge of the fundamental frequency, and, reversely, turning "ON" parts which are restored from an error state to a normal state, making the restored part process the fundamental frequency and a part which currently processes the fundamental frequency process its original frequency when the restored part is one for the fundamental frequency originally, and controlling and monitoring each unit constituting the base transceiver station.

2. The system according to claim 1, wherein an area controlled by the base transceiver station is divided into multiple sectors, each RFC and ACC are used in each sector one-on-one, and one SIC is used for all the sectors in common, the RFC, ACC, and SIC being divided into many parts for processing each frequency.

3. A method of automatically changing a frequency in a CDMA mobile communication system where multiple frequencies are assigned to a base transceiver station, wherein states of radio frequency card (RFC), analog common card (ACC), and sector interface card (SIC); are periodically checked thus parts of them where errors are detected are cut off, a frequency processed by the part having the error is detected and excluded from overhead data, and, when the frequency which is processed by the part having the error is a fundamental frequency, other part is made to take charge of the fundamental frequency, and, reversely, parts which are restored from an error state to a normal state are turned "ON", and the restored part is made to process the fundamental frequency as was before and a part which currently processes the fundamental frequency is made to process its original frequency when the restored part is one for the fundamental frequency.

4. The method according to claim 3, wherein the devices which are periodically checked are RFC, ACC, and SIC.

5. The method according to claim 4, wherein the RFC and ACC are periodically checked by the sector and the frequency, and the SIC is periodically checked by the frequency.

6. A method of automatically changing a channel of a CDMA mobile communication system when an error occurs in devices constituting a base transceiver station, the method comprising the steps of:

periodically checking the devices constituting the base transceiver station to determine whether an error occurs;

cutting off a part where the error is detected and determining whether the part having the error charges a fundamental frequency;

detecting remaining frequencies other than a frequency charged by the part having the error in case that the part having the error does not charge the fundamental frequency;

in case that the part charging the fundamental frequency has the error, causing other part currently operating in normal to charge the fundamental frequency;

transmitting new overhead data to terminals within a corresponding cell area, whereby the terminals receive the new overhead data and determine a new frequency according to a hash function;

periodically checking the devices of the base transceiver station to determine whether the device having the error is restored to a normal state;

turning on a part which is restored from an error state to the normal state and determining whether the part restored from the error state to the normal state is one for processing the fundamental frequency originally;

detecting a frequency processed by the part restored from the error state to the normal state in case that the part restored is not for the fundamental frequency, and, in case that the part restored from the error state to the normal state is for processing the fundamental frequency originally, restoring the part currently processing the fundamental frequency to process a frequency which it originally charges and causing the part restored from the error state to process the fundamental frequency alike in the original normal state; and transmitting new overhead data to terminals within a corresponding cell area and causing the terminals to receive the new overhead data and determine a new frequency according to a hash function.

7. The method according to claim 6, wherein the devices which are periodically checked are radio frequency card (RFC), analog common card (ACC), and sector interface card (SIC).

* * * * *